United States Patent Office 3,344,020
Patented Sept. 26, 1967

3,344,020
ETHYLENEBIS SULFONIUM SALTS FOR THE CONTROL OF SOIL-BORNE PATHOGENS AND AS SEED PROTECTANTS
Sheldon B. Greenbaum, Tonawanda, N.Y., assignor to Hooker Chemical Corporation, Niagara Falls, N.Y., a corporation of New York
No Drawing. Filed July 14, 1965, Ser. No. 472,049
15 Claims. (Cl. 167—33)

This is a continuation-in-part of my application Ser. No. 241,158, filed Nov. 30, 1962, now abandoned.

This invention relates to new compositions of matter useful in controlling fungi and soil-borne diseases caused by fungi and other organisms, and to methods for controlling plant diseases with said compositions. More specifically, the invention relates to ethylenebis(tetramethylenesulfonium) salts and ethylenebis(pentamethylenesulfonium) salts. Structures for these two types of compounds may be represented as follows:

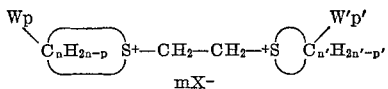

where n and n' are 4 to 5, W and W' are chloro, bromo, alkyl, alkoxy, or carboalkoxy ring substituents, p and p' are from zero to five, X⁻ is an anion, and m, the coefficient of X is up to two. If the anion is polyvalent, m varies according to the negative change to satisfy the rules of valency.

It can be seen that these structures are composed of two five- or six-membered rings or a 5 membered ring and a 6 membered ring, containing a sulfide linkage and having these rings joined through the sulfur groups by an alkylene chain two carbon atoms in length. Although the bis compounds are most easily made, similar compounds having both a 5- and 6-membered ring are useful and such compounds are included within the scope of the present invention.

The compounds of the invention are outstanding agents for combatting microbial plant pathogens. Such compounds are especially effective as soil fungicides and control soil borne diseases of plants, such as damping off and root rot. Closely related sulfonium compounds lacking the structural elements specified are substantially devoid of this type of intensive activity. This is illustrated in Example 1 where the compounds of the invention are compared with sulfonium compounds having a connecting chain longer than two carbon atoms, to compounds with open chain (non-cyclic) sulfonium centers and to compounds with a single sulfonium center. In all these cases, it can be seen that only the compounds of the present invention possess such a high rate of activity in combatting fungi and improving percentages of germination.

Included within the scope of this invention are the described uses of bis sulfonium salts composed of tetramethylene and pentamethylene sulfides which are substituted on the ring by halogens, e.g., chlorine, bromine, alkyl, alkoxy, carboalkoxy, and related substituents, frequently of 1 to 18 carbon atoms and preferably of 1 to 3 carbon atoms. Examples include ethylenebis(3-methyltetramethylenesulfonium bromide), ethylenebis(3-ethoxytetramethylenesulfonium bromide), ethylenebis(3,4 - dichlorotetramethylenesulfonium bromide), ethylenebis (3,4 - dibromotetramethylenesulfonium bromide), ethylenebis(2 - carbomethovytetramethylenesulfonium bromide), ethylenebis(3-heptadecyloxytetramethylenesulfonium bromide), ethylenebis(3-lauryloxytetramethylenesulfonium brobide). Alternatively these compounds can be named as thiophene derivatives. For example, ethylenebis (3-methyltetramethylenesulfonium bromide) is alternatively named ethylenebis(3-methyltetrahydrothiophenonium bromide).

The compounds of this invention may include an anion which is inorganic or organic in nature, so long as it is not phytotoxic to the plants involved at the rates employed. This can be seen in Example 3 where the dibromide, dichloride, dinitrate, dibisulfate and diacetate are shown to have the same activity. This listing is not limiting and mixtures of substituents may be employed. In actual practice, the anionic substituent sometimes exerts an effect on the physical and biological properties so as to make one or more of such anions preferable to others in a particular application. In general, however, dibromide, dichloride and dibisulfate are preferred embodiments of the invention partly because of their ease of preparation, as will be described hereinafter.

Combinations of the ethylenebis sulfonium cations with fungicidally active anions will serve to reduce the nonfunctioning proportion of the fungicide molecule and also will enhance the overall activity by controlling those aspects of the fungus complex which are more amenable to control by anionic fungistats and fungicides. Examples of such anions are 4,6-dinitro-o-cresolate, ethylenebis dithiocarbamate, diethyl dithiocarbamate, trichlorophenate, and the like.

Although a number of materials can be applied to the exposed surface of plants to control fungal infections, materials which are active against fungi attacking plants through their roots and which possess a characteristic ease of spreading through the soil to render good coverage of growing roots are particularly advantageous. The compounds of the present invention are not only excellent soil fungicides, but most also possess the valuable property of water solubility and give penetration through the soil and good coverage of the entire root area of a plant to be treated. Also because of this water solubility, most exhibit systemic activity in various plant species.

Another advantage of the compounds of the invention is in their ease of application to the soil. One previous method of freeing soil from disease causing organisms was by steaming. This process is obviously difficult and cumbersome. Likewise, the application of gaseous fumigants requires tenting or surface sealing methods for confining the gases and is of obvious inconvenience, expense, and sometimes is even dangerous to the operator. Those water soluble salts of the present invention may be applied to the soil by dissolving them in water and drenching the soil around the root area or they may be added to irrigating waters. The compounds of the present invention may be applied in formulations with various inert liquid diluents such as water, methanol, ethanol, butanol, N,N-dimethylformamide, xylene and others. For dry applications the compounds may be mixed with various inert dry diluents or carriers, such as pyrophyllite, diatomaceous earth, fuller's earth, dry ground clays and the like. As free-flowing powders or granules, they may be applied directly to the top of the ground, allowing rain to cause penetration or they may be spread onto the soil or into furrows by conventional equipment. The compounds of the invention show little or no toxicity to sensitive seeds and plants at rates of application many times those required for effective disease control. They may thus be used in the treatment of seeds, bulbs, seed pieces, roots or rhizomes prior to planting. Effective rates of application are from about one half an ounce to about two pounds per one hundred pounds of seed, bulbs, seed pieces, roots, or rhizomes, or when applied to the soil, from about one half pound to about 200 pounds per acre, depending on severity of infestation, species of pathogen, soil type, degree of control required, and nature of crop amongst other factors. Lower rates can be used by treating only the soil in the root zone of the crop plant. The water soluble compounds of the present invention may be conveniently applied by seed soaking or spraying. They may also be applied to the seeds as dusts. In another modification of the invention, the compounds are injected or infused into trees for control of vascular diseases, such as Dutch elm disease.

Compounds of the invention are readily prepared by mixing the cyclic sulfide and a dihalide, preferably dibromide, in a mole ratio of about two to one and permitting them to stand, preferably at 75 degrees centigrade, with or without a solvent but preferably with an ionizing solvent such as N,N-dimethylformamide. Some examples of other solvents that can be used are methanol, ethanol, or butanol. Other derivatives are readily made from the dibromide.

The high activity against fungi such as Pythium makes the compounds of this invention excellent adjuncts to other fungicides which do not control these fungi. It is, therefore, within the scope of this invention to combine the products of the invention with materials such as pentachloronitrobenzene, tetrachloronitrobenzene, dichloronitroaniline, sodium N-methyl dithiocarbamate, tetramethylthiuram disulfide, disodium ethylenebis dithiocarbamate, zinc ethylenebis dithiocarbamate, 2,4,5-trichlorophenates, and so forth, to obtain an additional fungicidal action.

In its practical application, the method of the invention may be used in connection with treatment of any of a variety of crops and plants, for example, cotton, peas, sugar beets, beans, other legumes, ornamentals, potatoes, grains, vegetables, pineapples, woody plants, and others.

In soil application, the chemicals of the invention may be applied at rates from about one pound per acre to about about one hundred pounds per acre (broadcast basis), depending on crop, pathogen, and soil type, as well as on other factors such as climatic conditions. By use of row treatment or, more generally, by application only into the root zone area of the crop plant, lower rates can be used.

The following examples are provided to illustrate the invention but are not to be construed as limiting it. All parts are by weight and all temperatures are in degrees centigrade, unless otherwise indicated.

*Example 1.—Control of pea seed decay*

Three inch clay pots were inoculated with infested soil containing *Pythium ultimum* and were then treated with a solution of 25 milligrams of active compounds in 50 milliliters of water containing 2 milliliters of 0.5 percent Triton X-114 (isooctylphenoxyethoxyethanol). The pots were allowed to stand covered for four days at room temperature and were planted with pea seed (var. Perfection). The stand of pea seedlings was noted after ten to twelve days. Results are tabulated as follows:

| Compound | Percent Germination |
|---|---|
| Untreated Control | 0 |
| [S⁺—(CH₂)ₙ—S⁺] 2Br⁻ | |
| n=2 | 100 |
| n=3 | 0 |
| n=4 | 0 |
| [S⁺—CH₂—CH=CH—CH₂—S⁺] 2Br⁻ | 0 |
| [S⁺—CH₂CH₂—S⁺] 2Br⁻ | 100 |
| CH₂=CH—CH₂S⁺—(CH₂)ₙ—S⁺—CH₂—CH=CH₂, with CH₃ groups, n=4 | 0 |
| CH₂=CH—CH₂S⁺—(CH₂)ₙ—S⁺—CH₂—CH=CH₂, with CH₃ groups, n=5 | 0 |
| [S⁺—C₂H₅ Br⁻] | 0 |
| [S⁺—C₄H₉ Br⁻] | 0 |

*Example 2.—Seed protectants*

Beet seeds were dusted with the compound shown, prior to planting in soil infested with a complex of seed decaying organisms (majority Pythium species) that usually cause severe damping-off of beets. Results are tabulated as follows:

| | Beet Seedlings Percent Emergence |
|---|---|
| [S⁺—CH₂CH₂—S⁺] 2Br⁻ | 84 |
| Untreated Controls | 28 |

*Example 3.—Control of pea seed decay by salts of*

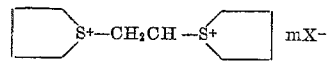

Three inch clay pots were inoculated with infested soil containing *Pythium ultimum* and were then treated with a solution of 25 milligrams of the above active compound, having different anions, in 50 milliliters of water containing 2 milliliters of 0.5 percent Triton X-114 (isooctylphenoxyethoxyethanol). The pots were allowed to stand covered for four days at room temperature and were planted with pea seed (var. Perfection). The stand was noted after ten to twelve days. Results are tabulated as follows:

Anion: Percent germination
 2 Br⁻ _____ 100
 2 Cl⁻ _____ 100
 2 NO₃⁻ _____ 100
 2 HSO₄⁻ _____ 100
 2 CH₃COO⁻ _____ 100

*Example 4.—Preparation of ethylenebis(tetramethylenesulfonium bromide) alternatively named ethylenebis (tetrahydrothiophenonium bromide)*

A mixture of 2.15 moles of tetrahydrothiophene, one mole of 1,2-dibromoethane and 150 milliliters of N,N-dimethylformamide was stirred together and then heated for seventy-two hours at 75 degrees centigrade. The crystals were removed by filtration, washed with acetone and recrystallized from an acetone and water mixture of 4:1 volume ratio. The soluble crystals melt at 196 degrees centigrade.

*Analysis.*—Calculated for $C_{10}H_{20}S_2Br_2$: Br, 44.1 percent. Found: Br, 43.9 percent (Volhard).

Example 5.—Ethylenebis(pentamethylenesulfonium bromide)

A mixture of two hundred and four grams of pentamethylene sulfide, ninety-four grams of 1,2-dibromoethane and 150 milliliters of N,N-dimethylformamide was heated at 75 degrees centigrade for seventy-two hours. The precipitate was removed and dried in vacuum to obtain a colorless crystalline water soluble product, M.P. 208–210 degrees centigrade.

*Analysis.*—Calculated for $C_{12}H_{24}S_2Br_2$: Br, 40.9 percent. Found: Br, 40.7 percent (Volhard).

Example 6.—Ethylenebis(tetramethylenesulfonium bisulfate)

The dibromide of Example 4 was dissolved in concentrated sulfuric acid and nitrogen was bubbled through the solution to remove bromine. The solution was then held under good vacuum for an hour, and finally was poured into an equal volume of water.

The addition of acetone precipitated the ethylenebis(tetramethylenesulfonium bisulfate) which melts at 196–198 degrees centrigrade.

Example 7.—Ethylenebis(tetramethylenesulfonium nitrate)

An aqueous solution of the dibromide of Example 4 was acidified with nitric acid and was treated with two equivalents of aqueous silver nitrate. The solution was reduced to a small volume and was diluted with ethanol. The sulfonium dinitrate formed decomposed at 163 degrees centigrade with the evolution of an orange gas.

*Analysis.*—Calculated for $C_{10}H_{20}N_2O_6S_2$: N, 8.6 percent. Found: N, 8.5 percent.

Example 8.—Formulations (a) Drench:
Ethylenebis(tetramethylenesulfonium
  bromide) _____lb.___ 1.0
Wetting agent (Triton X-114) _____lb.___ 0.1
Water _____gal.___ 100

(b) Dust (10 percent):
Ethylenebis(tetramethylenesulfonium
  bromide) _____lb.___ 1
Synthetic calcium silicates _____lbs.___ 9

Example 9.—Ethylenebis(tetramethylenesulfonium chloride)

The bisulfate of Example 6 was dissolved in water and was treated with one equivalent of barium chloride. The solution was evaporated and the chloride produced was recrystallized from methanol. The compound melted at 194–196 degrees centigrade (sealed tube).

*Analysis.*—Calculated for $C_{10}H_{20}Cl_2S_2$: Cl, 25.8 percent. Found: Cl, 25.5 percent.

Example 10.—Ethylenebis(tetramethylenesulfonium acetate)

The bisulfate of Example 6 was dissolved in water and treated with the equivalent of barium acetate in the presence of excess acetic acid. The solution was evaporated and the crystals were collected from acetone. The product melted at 194–196 degrees centrigrade.

Example 11.—Alternate preparation of ethylenebis(tetramethylenesulfonium bisulfate)

A mixture of 35 grams of water and 50 grams of 98 percent sulfuric acid was cooled in an ice bath and to this was added 25 grams of ethylenebis(tetramethylenesulfonium bromide). When solution was complete, 300 milliliters of acetone were slowly introduced. The bisulfate which precipitated after the addition of the acetone was collected, washed with acetone and dried. The yield was 25 grams of a white crystalline solid. After a thorough drying in vacuum over phosphorus pentoxide, the compound afforded the following analysis:

Melting point: 196–198 degrees centigrade.
Calculated for $C_{10}H_{20}S_4O_8$: S, 32.2 percent; $SO_4^=$, 48.2 percent.
Found: S, 32.3 percent; $SO_4^=$, 47.8 percent.

Example 12.—Preparation of ethylenebis(tetramethylenesulfonium zinc bromide chloride)

Solutions of 9.0 grams of ethylenebis(tetramethylenesulfoniumbromide) and 3.5 grams of zinc chloride in small amounts of water were combined. The white crystalline product which appeared after inducing crystallization on the sides of the beaker was filtered off and dried. The compound melted at 223–224 degrees centigrade. A 0.310 gram sample afforded 2.48 milliequivalents of halide by Volhard titration. The calculated value for $$C_{10}H_{20}Br_2Cl_2S_2Zn$$

is 2.48 milliequivalents.

Example 13.—Ethylenebis(tetramethylenesulfonium ferricyanide)

A solution of 9.0 grams of ethylenebis(tetramethylenesulfonium bromide) in 25 milliliters of water was combined with a solution of 8.0 grams of potassium ferricyanide in a similar amount of water. The yellow compound which formed was removed by filtration and dried.

Example 14.—Hydrogen ethylenebis(tetramethylenesulfonium ferrocyanide)

A solution of 4.2 grams of potassium ferrocyanide in 20 milliliters of water was combined with a solution of 4.1 grams of ethylenebis(tetramethylenesulfonium bisulfate) in a similar amount of water. The white crystalline product which formed was removed by filtration. The salt, a trihydrate, analyzed as follows:

*Analysis.*—Calculated for $C_{16}H_{30}FeN_6O_3S_2$: S, 13.6 percent. Found: S, 13.5 percent.

Example 15.—Ethylenebis(tetramethylenesulfonium) salts with copper, manganese or zinc ferricyanide (a) A solution of 7.5 grams of cupric sulfate (pentahydrate) and 12.5 grams of ethylenebis(tetramethylenesulfonium bisulfate) in 100 milliliters of water was slowly added to a solution of 16.5 grams of potassium ferricyanide in 200 milliliters of water with stirring. The resulting green precipitate was recovered by suction filtration. It was then washed with several liters of water and then dried. The yield was 12.5 grams of ethylenebis(tetramethylenesulfonium) cupric ferricyanide.

(b) In a similar manner, substituting 5.9 grams of manganous chloride for the cupric sulfate, there was obtained a brown precipitate, ethylenebis(tetramethylenesulfonium manganous ferricyanide. The yield was 12.5 grams.

(c) In a similar manner, substituting 8.6 grams of zinc sulfate heptahydrate for the cupric sulfate and employing 14.4 grams of ethylenebis(tetramethylenesulfonium bisulfate) there was obtained 18.9 grams of ethylenebis(tetramethylenesulfonium) zinc ferricyanide, a bright yellow compound.

*Analysis.*—Calculated for $C_{54}H_{60}Fe_4N_{24}S_6Zn_3$: S, 11.6 percent. Found: S, 11.6 percent.

Example 16.—Ethylenebis(tetrahydrotetramethylenesulfonium 4,6-dinitro-O-cresolate)

A solution of 11.0 grams of sodium 4,6-dinitro-O-cresolate in 300 milliliters of water was added to 9.6 grams of ethylenebis(tetramethylenesulfonium bromide)

in 100 milliliters of water with stirring. A deep orange precipitate of the salt was formed. The compound was recrystallized from a mixture of acetone and hexane and then dried. The orange compound melted at 89–90 degrees centigrade. It was quite insoluble in water.

*Example 17*

The compounds prepared in accordance with Examples 12–15 were tested for effectiveness in the control of *Pythium ultimum* in the following manner. Soil, infested with *Pythium ultimum*, was treated by dispersing the test compound as a finely divided solid, throughout the soil to a depth of about three inches, in an amount equivalent to about 62 pounds per acre. The treated soil was kept covered for four days at room temperature. The soil was then planted with pea seeds (var. Perfection). The stand of pea seedlings was noted after ten to twelve days. The results are tabulated as follows:

| Product of Example | Formula | | Pea Seedlings, Percent Germination 62 lbs./acre |
|---|---|---|---|
| 12 | 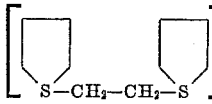 | $ZnBr_2Cl_2$ | 80 |
| 13 | 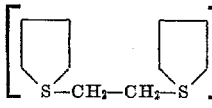 | $[Fe(CN)_6]_2$ | 90 |
| 14 | 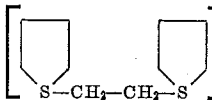 | $H_2Fe(CN)_6 \cdot 3H_2O$ | 60 |
| 15a | 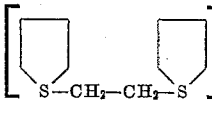 | $Cu_3[Fe(CN)_6]_4$ | 80 |
| 15b | 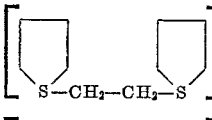 | $Mn_3[Fe(CN)_6]_4$ | 80 |
| 15c | 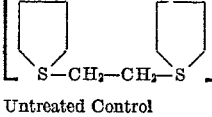 | $Zn_3[Fe(CN)_6]_4$ | 70 |
| Untreated Control | | | |

The invention has been described with respect to illustrative examples and preferred embodiments thereof. It is not limited thereto and modifications may be made therein and equivalents may be substituted without going beyond the bounds of the invention and the scope of the claims.

What is claimed is:

1. A method for controlling organisms pathogenic to plants which comprises applying to the locus of said organisms an amount of the composition:

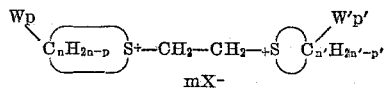

wherein $n$ and $n'$ are four to five; W and W' are selected from the group consisting of chloro, bromo, alkyl, alkoxy, and carboalkoxy ring substituents; $p$ and $p'$ are from zero to five; $X^-$ is an anion; and $m$, the coefficient of X, is up to two, said composition being applied in an amount sufficient to control the growth of said organisms.

2. A method for controlling fungi which comprises applying to surfaces to be subjected to fungal attack a composition of the formula:

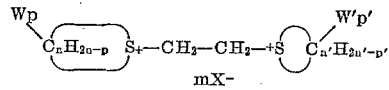

wherein $n$ and $n'$ are four to five; W and W' are selected from the group consisting of chloro, bromo, alkyl, alkoxy, and carboalkoxy ring substituents; $p$ and $p'$ are from zero to five; $X^-$ is an anion; and $m$, the coefficient of X, is up to two, said composition being applied in sufficient amount to limit fungal growth.

3. A method for controlling diseases of seed and for preserving seed which comprises applying to seed a composition of the formula

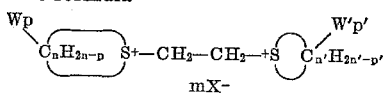

wherein $n$ and $n'$ are four to five, W and W' are selected from the group consisting of chloro, bromo, alkyl, alkoxy, and carboalkoxy ring substituents, $p$ and $p'$ are from zero to five; $X^-$ is an anion; and $m$, the coefficient of X, is up to two, said composition being applied in sufficient quantity to prevent disease and preserve the seed.

4. A method for controlling soil borne plant diseases which comprises applying to the soil a disease controlling proportion of a compound of the formula:

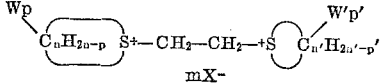

wherein n and n' are four to five; W and W' are selected from the group consisting of chloro, bromo, alkyl, alkoxy, and carboalkoxy ring substituents; p and p' are from zero to five; X⁻ is an anion; and m, the coefficient of X, is up to two.

5. A method for controlling vascular diseases of plants which comprises applying a composition of the formula:

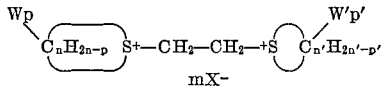

wherein n and n' are four to five; W and W' are selected from the group consisting of chloro, bromo, alkyl, alkoxy, and carboalkoxy ring substituents; p and p' are from zero to five; X⁻ is an anion; and m, the coefficient of X, is up to two, said composition being applied to a plant in a manner to cause said composition to enter the vascular system of the plant.

6. A method for controlling organisms pathogenic to plants which comprises applying to the locus of said organisms an amount of ethylene-bis(tetramethylenesulfonium bromide) which controls the growth of said organisms.

7. A method for controlling organisms pathogenic to plants which comprises applying to the locus of said organisms an amount of ethylene-bis(tetramethylenesulfonium bisulfate) which controls the growth of said organisms.

8. A method for controlling organisms pathogenic to plants which comprises applying to the locus of said organisms an amount of ethylene-bis(pentamethylenesulfonium chloride) which controls the growth of said organisms.

9. A method for controlling organisms pathogenic to plants which comprises applying to the locus of said organisms an amount of ethylene-bis(pentamethylenesulfonium bromide) which controls the growth of said organisms.

10. A composition for controlling pathogenic organisms which comprises a compound of the formula:

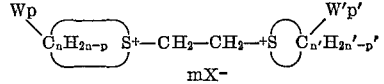

wherein n and n' are four to five; W and W' are selected from the group consisting of chloro, bromo, alkyl, alkoxy, and carboalkoxy ring substituents; p and p' are from zero to five; X⁻ is an anion; and m, the coefficient of X, is up to two, and an inert medium throughout which said compound is evenly distributed.

11. A composition for controlling fungi which comprises a compound of the formula:

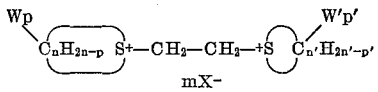

wherein n and n' are four to five; W and W' are selected from the group consisting of chloro, bromo, alkyl, alkoxy, and carboalkoxy ring substituents; p and p' are from zero to five; X⁻ is an anion; and m, the coefficient of X, is up to two, a fungicidal material having a low activity against Pythium, and an inert medium throughout which the other materials are evenly distributed.

12. A fungicidal composition which comprises ethylenebis(tetramethylenesulfonium bromide) and an inert medium throughout which the bromide is distributed.

13. A fungicidal composition which comprises ethylenebis(tetramethylenesulfonium chloride) and an inert medium throughout which the chloride is distributed.

14. A fungicidal composition which comprises ethylenebis(pentamethylenesulfonium bromide) and an inert medium throughout which the bromide is distributed.

15. A fungicidal composition which comprises ethylenebis(tetramethylenesulfonium bisulfate) and an inert medium throughout which the bisulfate is distributed.

References Cited

UNITED STATES PATENTS 3,270,034   8/1966   Greenbaum _____ 260—327

OTHER REFERENCES

Runge et al.: J. Prakt. Chem. pp. 279–292 (1955), Chem. Abstracts 59#, 11398e (1963).

LEWIS GOTTS, *Primary Examiner.*

S. K. ROSE, *Assistant Examiner.*

UNITED STATES PATENT OFFICE
CERTIFICATE OF CORRECTION

Patent No. 3,344,020                            September 26, 1967

Sheldon B. Greenbaum

It is certified that error appears in the above identified patent and that said Letters Patent are hereby corrected as shown below:

Column 2, line 8, "carbomethovytetramethylenesulfonium" should read -- carbomethoxytetramethylenesulfonium --; line 11, "brobide" should read -- bromide --. Column 4, line 52, "CH" should read -- $CH_2$ --. Column 6, line 60, after "sulfonium" insert a closing parenthesis. Column 7, in the table, second column, second formula thereof, that portion reading "[Fe(CN$_6$]$_2$" should read -- [Fe(CN)$_6$]$_2$ --; same table, third column, opposite "Untreated Control", insert -- 0 --.

Signed and sealed this 13th day of January 1970.

SEAL)

Attest:

Edward M. Fletcher, Jr.                     WILLIAM E. SCHUYLER, JR.
Attesting Officer                                Commissioner of Patents